United States Patent [19]

Schmidt et al.

[11] 3,873,335

[45] Mar. 25, 1975

[54] PROCESS FOR THE MANUFACTURE OF FREE-FLOWING TITANIUM DIOXIDE PIGMENTS

[75] Inventors: Günter Schmidt, Leverkusen; Carlo Servais, Odenthal, both of Germany

[73] Assignee: Kronos Titan G.m.b.H., Leverkusen, Germany

[22] Filed: Aug. 20, 1973

[21] Appl. No.: 389,467

[52] U.S. Cl............. 106/300, 106/308 B, 106/309, 423/267
[51] Int. Cl............................................. C09c 1/36
[58] Field of Search................ 106/300, 309, 308 B

[56] References Cited
UNITED STATES PATENTS

| | | | |
|---|---|---|---|
| 3,449,271 | 6/1969 | O'Connor et al. | 106/300 |
| 3,567,138 | 3/1971 | Fields | 106/300 |
| 3,764,362 | 10/1973 | Henley et al. | 106/300 |

*Primary Examiner*—Delbert E. Gantz
*Assistant Examiner*—J. V. Howard

[57] ABSTRACT

A post-treated titanium dioxide pigment having good free-flowing properties both before and after pressure loading is prepared by screening and rolling the pigment in the presence of a highly dispersed metal or non-metal oxide.

11 Claims, No Drawings

PROCESS FOR THE MANUFACTURE OF FREE-FLOWING TITANIUM DIOXIDE PIGMENTS

BACKGROUND OF THE INVENTION

It is known from German Pat. DT-PS No. 964,393 that fine particle size oxides and silicates may be rendered dust-free by slurrying them with water, putting the slurry through a screen and forming the filtered material into small balls. According to this procedure agglomeration of the fine particles is achieved via the aqueous phase. However, this process cannot be considered for $TiO_2$ pigments since optical properties and dispersibility are impaired. For this reason an attempt was made, as disclosed in German Pat. DT-AS No. 1,041,472, to granulate fine particle size powders, particularly pigments, in the dry state by means of classifying screens and subsequent rolling. Although the granulated powders produced by this process are free flowing, the granulates have, however, only a slight resistance to compression forces; and when stored under pressure loads, for example, in bags and silos, lose their free-flowability or else are considerably impaired in their dispersing properties. Another method of making powdered substances free-flowing and/or retain their free-flowing characteristics, and/or to prevent their agglomeration consists in adding to the powdered substances small amounts of highly dispersed metal or non-metal oxides [German patent application No. D 16,548], especially fine particle size silicic acid, [German Pat. DT-OS No. 1,642,998]. This addition is carried out by simple mixing either during milling of the powdered substances or after their manufacture. However, in the case of titanium dioxide pigments, mixing a highly dispersed active silicic acid with pigmentary $TiO_2$ fails to produce a free-flowing pigment; nor does the pigment have stacking strength, i.e., resistance to compacting. Up to present time, all these earlier processes have been, for the reasons shown, unsuitable for production of free-flowing titanium dioxide pigments with good stacking strength.

It is highly desirable, therefore, that a process be found for transforming titanium dioxide pigments, which have a natural tendency to dust and compact, into a free-flowing form having good stacking strength; and without impairing their optical properties and dispersibility.

SUMMARY OF THE INVENTION

The invention is concerned with a process for the manufacture of free-flowing titanium dioxide pigments having good dispersibility and stacking strength wherein the term "stacking strength" is to be understood to mean resistance to compacting and/or retention of the free-flowing characteristics of the $TiO_2$ pigment even after storage under relatively high or heavy pressure loads, as the case may be.

Owing to the tendency of these materials to cement together and to dust when being transported and weighed, the handling of fine particle size substances in powder form, such as titanium dioxide pigments, is accompanied by difficulties.

These difficulties have been solved, according to the instant invention, by screening dry, milled titanium dioxide pigment and then subjecting it to a rolling process in the presence of highly dispersed metal or nonmmetal oxides.

PREFERRED EMBODIMENTS OF THE INVENTION

It is noteworthy that titanium dioxide pigments having these desired properties are obtained only when the individual steps of the process are performed in a definite sequence. Thus, the addition of the highly dispersed oxides of this invention should take place after the dry pigment has been screened and either prior to the rolling process or, preferably, during the rolling process after the pigment agglomerates have been rounded off and somewhat firmed. If the highly dispersed substance is admixed with the dry pigment before screening, agglomeration difficulties may occur during the rolling process. Also, the pigment granulates may be only moderately or poorly compacting resistant.

It is known, of course, that by screening the pigment the coarse particles, which in general comprise cemented agglomerates, are broken up into smaller size particles as a consequence of which particle size distribution of the screened pigment is narrowed. The mesh widths of the screen used is preferably between 0.3 and 5.0 mm, preferably between 0.75 and 2.0 mm, and are responsible, in part, for the particle size of the screened pigment. During subsequent rolling, in the presence of the highly dispersed oxides, the pigment particles are granulated. It is postulated that by rolling the pigment in the presence of the oxides, the latter are intimately associated with the soft pigment agglomerates and/or the granulated pigment particles. However, without the initial screening, pigment granulation by rolling is imperfect owing to the broad pigment size distribution. Consequently, any oxide treatment is spotty with the result that the resistance of the pigment to compacting under pressure is unsatisfactory.

As highly dispersed oxide additions, metal and non-metal oxides are preferred, especially highly dispersed silicic acid prepared by flame hydrolysis or precipitation followed by micronizing; or finely divided oxides of aluminum and/or titanium.

In addition to these, other highly dispersed, non-colored substances with slight tendency for cementing may be used such as silicates, phosphates of the alkali or alkaline earth metals, alkaline earth carbonates, metal soaps or polyalcohols. Also, titanium dioxide pigments have been transformed by a special inorganic and/or organic treatment into a hydrophobic form having only a slight tendency to cement and being generally strongly dusting, are suitable additions. Such titanium dioxide pigments have the advantage that they present no foreign substance in the free-flowing pigment and thus have no diluting effect.

The preferred metal and non-metal oxides are colorless and chemically inert to $TiO_2$ pigments, as well as to substances to which the pigments are subsequently added. In order that the optical properties of the pigments such as gloss, gloss haze and dispersibility are not impaired, these oxides must be of fine particle size and as free as possible from sintered aggregates or hard agglomerate particles since these cannot be dispersed when added to coating compositions or plastics. The oxide types that are commerically available are either amorphous by x-ray, or crystalline; they have specific surfaces measured according to the BET method of 10 to 400 sq. m/g, preferably 100–300 sq. m/g and the primary particles have mostly a mean particle size of about 10–20 nm. By suitable post-treatment hydrophobic forms, as well as hydrophilic forms are produced. Depending on the starting pigment or its field of application, one or the other form is preferred. The optimum amounts of oxide addition must be determined in each case. They depend on the pigment used and the added oxide type. In general, 0.1 to 5.0% of a highly dispersed oxide are sufficient, based on the amount of titanium dioxide pigment to be treated, preferably from about 0.25 to 2.0%.

The rolling process for the purpose of granulating the pigment may be carried out in the customary devices such as rotary drums, rotary pipes, or rotary disks. It may be carried out discontinuously, for example, in rotary drums, or continuously, as for example, in rotary pipes. Continuous processing in slightly inclined rotary pipes is preferred in which case suitable devices may be provided for regulating duration periods and the rotary motion. Also, apparatus may be employed which combines a screen with a rotary pipe.

The size of the small pigment balls formed during granulation of the pigment depends, apart from the effect of screening, on the rolling time, the filling height of the pigment in the rotating device, and on the rotating velocity. The latter should be adjusted in such a way that the pigment rolls off the walls at the inclined filling level. If the velocity is too great, the pigment falls downward without rolling motion; if, on the other hand, it is too slow, then the pigment filling simply slides, without rolling movement, off the wall of the rotary device.

Under definite screening and rolling conditions, such as type and dimensions of the rolling equipment and the velocity of rotation, the particle size of the pigment balls is largely influenced, at constant rolling time, by the filling level; and at constant filling level by the rolling time. The higher the degree of filling and the longer the rolling period, the larger in general, grow the little balls. As a rule, with increasing rolling times the stacking strength and bulk weight of the free-flowing pigment is increased; on the other hand, its dispersibility is impaired.

The rolling times necessary for a desired optimum free-flowing property must, therefore, be determined experimentally; and are between 1 and 120 minutes, preferably between 2 and 60 minutes.

The process according to the invention may be applied to all known types of TiO$_2$ pigments. It is suitable for anatase TiO$_2$ pigments, as well as for rutile TiO$_2$ pigments and it is immaterial whether they are manufactured according to the sulfate or chloride or any other process. Also, they may have been post-treated in the customary manner with inorganic and/or organic compounds, as for example relatively insoluble, colorless compounds of aluminum, titanium, silicon, and the like.

The TiO$_2$ pigments obtained according to the process of this invention excell by their outstanding free-flowing ability. Moreover, they do not dust and are resistant to compacting as evidenced by retention of the original free-flowing characteristics after storing while subjected to pressure. Moreover, by the mechanical treatment and the addition of the highly dispersed oxides mentioned above, the optical properties and dispersibility of the pigments in vehicles and plastics are not impaired. Further, they can be used universally and are particularly suitable for pigmenting plastics. The bulk weights of the free-flowing pigments treated according to the invention may be up to 50% higher in comparison with non-treated pigments.

The invention and the advantages obtained with it are explained in more detail in the Examples below.

The following tests were used in evaluating the pigments:

TESTS

1. Free Flowing Ability

The determination of this property was carried out similarly to a method described by K. Klein in "Seifen - Oele - Fette - Wachse" (Soaps, Oils, Fats, Waxes) 94 (1968), pages 853 to 854. It is based on the principle of the smooth flow of the pigments through standardized funnels. Glass containers similar to hour-glasses with discharge tubes of varying diameter served as funnels. The cylinder of the hour-glasses had an inner diameter of 42 mm, and a height of 90–60mm; a cone height of 30 mm, and interchangable discharge tubes of 45 mm length with diameters of 2.5; 5; 8; 12; 15 and 18 mm. In the Examples, the diameters given are those through which the pigment still flowed freely. A pigment having a smooth flow through a tube having a 2.5 mm diameter is considered to be a very good free-flowing pigment; whereas a pigment requiring an 18 mm diameter is considered to be a poorly flowing pigment.

2. Stacking Strength

The test was made by pressure loading a 2.5 cm high layer of titanium dioxide pigment with a superimposed weight of 0.16 kg/sq. cm for a period of 24 hours. Following this loading the free-flowing property of the pigment was tested again.

3. Dispersibility a. In Plastics

Measurement of the dispersibility in plastic was determined by the number and size of the pigment agglomerates which were visible in the plastic after being worked into this medium. For this test the pigment was charged on to a black sheet of PVC in a roll mill and worked in for a definite time under definite conditions, as described by K. U. Meckenstock in "Gummi - Asbest - Kunststoffe" (Rubber - Asbestos - Plastics) 24 (1971), pages 937 to 938. The judging of the dispersed state of the individual pigments was made visually according to the following scale:

DISPERSING VALUE 1 = excellent pigment distribution PVC sheet surface free of white streaks and dots;

DISPERSING VALUE 2 = individual small white pigment streaks in the surface of the sheet;

DISPERSING VALUE 3 = numerous pigment agglomerates in the sheet surface;

DISPERSING VALUE 4 = many and in part large pigment agglomerates in the surface of the sheet; and DISPERSING VALUE 5 = very many and in part very large pigment agglomerates in the surface of the sheet.

Intermediate grades can easily be determined by an examining of larger numbers of samples.

b. Varnishes

A measure of the dispersibility in varnishes was the size of the agglomerates present in the pigmented medium. This determination was carried out in a highly viscous pigment vehicle system according to DIN draft 53,239 (Farbe und Lack 78 (1972) page 539) wherein the number of revolutions in the varnish rub-up as was limited to twice 25 revolutions (compare section 5.2 of the Norm.). An alkyd resin free of solvent was employed as a vehicle (see section 4.5 of the Norm). The evaluation was done in Hegman units according to DIN 53,203.

In addition, the various optical properties of the pigments such as tinting strength, brightness and tone, before and after treatment according to the invention, were tested.

EXAMPLE 1

In each case 200 g of rutile pigment, post-treated in the known manner with 2.0% hydrous oxide of silicon and 2.0% hydrous oxide of aluminum, on pigment weight basis were used. Using the free-flowing hourglass test supra, such a pigment showed poor free-flowing ability using a discharge tube diameter of 18mm; and after pressure loading the pigment was not at all free-flowing. Its dispersibility in plastics was judged to be 2.3 and its dispersibility in varnishes was 7.0 according to the Hegman scale. For the purpose of improving its free-flowing properties, this pigment was subjected to the following treatments. For comparison the results are compiled in Table 1 below:

a. The pigment was screened through a screen of 0.75 mm mesh width and subsequently rolled in a 1 liter flask for 30 minutes at 50 rpm about its longitudinal axis. After an initial rolling period of 10 minutes, 1.0% highly dispersed hydrophilic silicic acid, on a pigment weight basis, was added and after 10 minutes of additional rolling an additional 1% silicic acid was added. The pigment thus obtained showed good granulation. Its free flowing characteristic, using the hourglass test with a discharge tube diameter of 5 mm, was considered "good". Its free-flowing characteristics had not changed after a 24 hour load with 0.16 kg/sq.cm. Its dispersibility in plastics was found to be 2.0 and the Hegman value, in varnishes was 7.0. None of the tested optical properties had been impaired when compared with the untreated pigment.

b. The pigment was treated as described under (1)(a) above with the difference that the addition of the highly dispersed silicic acid was not made in two different charges but all the silicic acid was added at one time after the initial 10 minutes rolling time. The examination of the pigment obtained showed that the results were not worse than those obtained under the conditions of the Example (1)(a).

c. On the other hand, when the post-treated pigment sample was screened and rolled but not treated with silicic acid as under (1)(a) and (1)(b) then the pigment had, initially, good free-flowing characteristics at dis-

TABLE NO. 1

| EXAMPLE | PIGMENT WITH POST-TREATMENT | ADDITION SiO$_2$ | PROCESSING STEPS |
|---|---|---|---|
| 1 (control) | Rutile with 2.0% Al$_2$O$_3$ and 2.0% SiO$_2$ | — | NONE |
| 1a | do. | 2.0% hydrophilic silicic acid | Screening followed by total 30 min rolling at 50 rpm with 1% SiO$_2$ addition after 10 min and 20 min, respectively. |
| 1b | do. | do. | Screening followed by total 30 min rolling at 50 rpm with 2.0% SiO$_2$ addition after 10 min. |
| 1c | do. | — | Screening followed by 30 min. rolling at 50 rpm. |
| 1d | do. | 2.0% hydrophilic or 2.0% hydrophobic silicic acid | Mixing in rapid mixer 2 minutes |
| 1e | do. | do. | Mixing in steam mill |
| 1f | do. | 2.0% hydrophilic silicic acid | Mixing (rapid mixer) screening followed by 30 min rolling at 50 rpm. |
| 1g | do. | do. | Mixing followed by 30 min rolling at 50 rpm. |

| | SCREEN MESH WIDTH mm | FREE-FLOWING ABILITY-mm DISCHARGE TUBE DIAMETER | STACKING STRENGTH IN TERMS OF FREE-FLOWABILITY TUBE DIAMETER, (following loading) | DISPERSIBILITY IN PLASTICS | VARNISHES |
|---|---|---|---|---|---|
| 1 | — | 18 | none | 2.3 | 7.0 |
| 1a | 0.75 | 5 | 5 | 2.0 | 7.0 |
| 1b | 0.75 | 5 | 5 | 2.0 | 7.0 |
| 1c | 0.75 | 5 | 18 | 2.3 | 7.0 |
| 1d | — | none | none | — | — |
| 1e | — | 18 | none | — | — |
| 1f | 0.75 | 5 | none | 2.3 | 7.0 |
| 1g | — | 15 | 18 | — | — | charge tube diameter of 5 mm. However, after pressure loading the pigment had lost this property to a large degree.

d. Again, when the post-treated pigment was simply mixed with 2.0% highly dispersed hydrophilic or hydrophobic silicic acid in a rapid mixer for two minutes, that is to say, with no screening or rolling then the subsequent test for free-flowing was negative.

e. Also, when the post-treated pigment was simply steam milled in the presence of 2.0% highly dispersed hydrophilic or hydrophobic silicic acid it showed no free flowing properties.

f. The post-treated pigment and 2.0% highly dispersed hydrophilic silicic acid were first mixed for 2 minutes in a rapid mixer, then put through a screen having a mesh width of 0.75 mm and thereafter rolled in a one liter powder flask for 30 minutes at 50 rpm. Prior to pressure loading the pigment obtained showed good free flowing characteristic using a discharge tube of 5 mm diameter, but after pressure loading the pigment was no longer free-flowing.

g. Using the process of (f) supra with the difference, however, that screening was omitted, then after 30 minutes rolling a poorly flowing pigment was obtained at a discharge tube diameter of 15 mm, and had even worse flowing properties after pressure loading.

As can been seen from the Table 1 below, satisfactory results regarding free flowability were obtained only by treating the pigment according to the process of this invention [Examples (1)(a) and (1)(b)]. When, however, the procedures of the prior art are followed — Example (1)(c)—screening and rolling without silicic acid; and Examples (1)(d) and (1)(e) — admixture of silicic acid without subsequent screening and rolling — then the free flowing and compacting characteristics were inadequate.

Further, mixing the post-treated pigment with silicic acid prior to screening and rolling resulted in a free-flowing pigment. However, it did not show sufficient resistance to compacting [Example (1)(f)]. Also, by omitting the screening [Example (1)(g)] the free flow properties of the pigment were also impaired as compared to screened pigments.

EXAMPLE 2

A rutile pigment that had been post-treated with 1.0% hydrated alumina and made hydrophobic by an organic post-treatment with 0.5% silicone oil, on pigment weight basis, was processed. This pigment was particularly suitable for use in plastics. The untreated pigment was not free-flowing. Its dispersing value in plastics was 2.0.

a. 200 g of this pigment were screened through a screen of 1.0 mm mesh width, mixed with 1% highly dispersed hydrophobic silicic acid, based on the weight of the pigment, and subsequently rolled in a 1 liter powder flask for 30 minutes at 40 rpm. The granulated pigment obtained had good flowability when tested using a discharge tube of 5 mm diameter, and its flowability did not change even after pressure loading. The dispersing value in plastics was improved by 1.0 unit of measure over the untreated starting pigment and the optical properties remained unchanged.

b. For comparison the same pigment as described under (2)(a), but without addition of silicic acid, had, immediately after granulation, good flowing properties when tested in a discharge tube having a 5 mm diameter, but after pressure loading was free flowing, only at discharge tube diameter of 18 mm. The results are recorded in Table 2.

TABLE NO. 2

| EXAMPLE | PIGMENT WITH POST-TREATMENT | ADDITION SiO$_2$ | PROCESSING STEPS |
|---|---|---|---|
| 2 (control) | Rutile with 1.0% Al$_2$O$_3$ — plus 0.5% Silicone oil | — | none |
| 2a | do. | 1.0% hydrophobic silicic acid | Screening, SiO$_2$ addition 30 min rolling at 40 rpm |
| 2b | do. | — | Screening, 30 min rolling at 40 rpm |
| 3 (control) | Rutile with 1.0% Al$_2$O$_3$ | — | none |
| 3a | do. | 1.0% hydrophilic silicic acid | Screening, 40 min. rolling at 50 rpm; after 10 and 20 min each time 0.5% SiO$_2$ addition |
| 3b | do. | — | Screening, 40 min rolling at 50 rpm |

| | SCREEN MESH WIDTH mm | FREE-FLOWING ABILITY-mm DISCHARGE TUBE DIAMETER | STACKING STRENGTH IN TERMS OF FREE-FLOWABILITY TUBE DIAMETER, (following loading) | DISPERSIBILITY IN PLASTICS | VARNISHES |
|---|---|---|---|---|---|
| 2 | — | none | none | 2.0 | — |
| 2a | 1.0 | 5 | 5 | 1.0 | — |
| 2b | 1.0 | 5 | 18 | 2.0 | — |
| 3 | — | none | none | 2.3 | 6.0 |
| 3a | 0.75 | 2.5 | 2.5 | 2.3 | 6.0 |
| 3b | 0.75 | 5 | 18 | 2.3 | 6.0 |

EXAMPLE 3 a. A rutile pigment which was post-treated in the known manner with 1.0% hydrated alumina, on pigment weight basis, and was not free-flowing and whose dispersing value in plastics was 2.3 and its Hegman value 6.0 in varnishes was screened in 200 g portions through a screen with a mesh width of 0.75 mm and rolled for 40 minutes at 50 rpm in a 1 liter flask. After 10 and 20 minutes rolling time, respectively, 0.5% highly dispersed hydrophilic silicic acid was added in each case. The granulated pigment was free-flowing in a discharge tube of 2.5 mm diameter and therefore, showed very good flowing properties which remained unchanged even after pressure loading. Dispersibility and optical properties were also unchanged in comparison with the untreated pigments.

b. If the same pigment was screened and rolled as in (3)(a) but without the addition of silicic acid, it had good free-flowing properties prior to pressure loading [using a 5 mm discharge tube]; but after pressure loading it flowed only with difficulty [using an 18 mm discharge tube]. The values found are shown in Table 2. These results show clearly the superiority of the procedure according to the invention compared with the prior processes.

EXAMPLE 4

In this example, larger rotary drums were employed for the rolling process. A rutile pigment post-treated with 1.0% hydrated alumina and, in addition, post-treated with 0.5% silicone oil, on pigment weight basis, for use in plastics was processed. Without the treatment according to the invention, it was not free flowing. The determination of the dispersibility in plastics resulted in a value of 1.0.

a. 5 kg of this pigment were screened through a screen of 1 mm mesh width, mixed with 0.5% of highly dispersed hydrophilic silicic acid and subsequently rolled in a rotary drum of 32 cm diameter and 47 cm length at 14 rpm for 10 minutes. The granulated pigment thus obtained showed good free flowing properties through a 5 mm discharge tube both before and after pressure loading. Dispersibility and optical properties were invariably good compared with the starting pigment.

b. 15 kg of this same pigment were put through a screen of 1 mm mesh width and rolled in a rotary drum of 1 m diameter and 40 cm length for 6 minutes at 8.5 rpm. After 1 minute rolling time 0.5% highly dispersed hydrophilic silicic acid were added. The granulated product obtained was somewhat coarser than the one produced according to (4)(a). However, it had good free-flowing properties through an 8 mm discharge tube both before and after pressure loading. The optical properties were unchanged compared with the starting pigment; the same was true for the dispersing value: 1.0.

EXAMPLE 5 a. This example serves to illustrate a continuous procedure for processing pigment according to this invention. The rolling took place in a rotary pipe of 1 m length having an inner diameter of 9.3 cm. Into this pipe are secured 4 ring-shaped disks of 2 cm height. At a 3% slope of the rotary pipe the pigment was rolled at 40 rpm. The thruput of the pigment was 30 g/min., which corresponded to an average running time of the pigment in the rotary pipe of about 30 minutes. A rutile pigment post-treated with 1.0% hydrated alumina, on pigment weight basis, was used. The pigment was not free flowing in the untreated state. Its dispersing value in plastics was 3.0. After screening through a screen having mesh width of 0.75 mm the pigment was mixed with 2.0% of a highly dispersed hydrophilic silicic acid and then rolled in the rotary pipe. The granulated product obtained had good free flowing properties when discharged through a tube of 2.5 mm diameter, both before and after pressure loading. The dispersing value and the optical characteristics were practically unchanged compared wiht the starting pigment.

b. The above experiment was repeated with the difference that after screening only 0.25% of highly dispersed hydrophilic silicic acid was added. Even with this small addition the free-flowing property, prior to pressure loading, was considered "very good" [using a 2.5mm discharge tube] and after pressure loading as good [using a 5 mm discharge tube].

c. When proceeding as described under (5)(a), but with the difference that the pigment was put through a screen of 2.0 mm mesh width the product showed good free flowability through a discharge tube of 5 mm diameter both prior to and after pressure loading.

d. On the other hand, if the same pigment was screened and rolled without the silicic acid addition described under (5)(a), then immediately after rolling a good, free flowing pigment was obtained as tested in 5 mm discharge tube. However, after pressure loading the pigment lost its free flowability, that is to say, it had substantially no stacking strength.

e. When this same pigment was mixed with 2.0% silicic acid and subsequently rolled as described under (5)(a), but, without previous screening then flowing properties of the granulated product obtained were impaired both prior to and after pressure loading as compared with the screened product. The results of the Examples 4 and 5 are recorded in Table 3.

TABLE NO. 3

| EXAMPLE | PIGMENT WITH POST-TREATMENT | ADDITION $SiO_2$ | PROCESSING STEPS |
|---|---|---|---|
| 4 (control) | Rutile with 1.0% $Al_2O_3$ plus 0.5% Silicone oil | — | NONE |
| 4a | do. | hydrophilic silicic acid | Screening, addition of $SiO_2$ 10 min. rolling at 14 rpm. |

TABLE NO. 3—Continued

| EXAMPLE | PIGMENT WITH POST-TREATMENT | ADDITION $SiO_2$ | PROCESSING STEPS |
|---|---|---|---|
| 4b | do. | 0.5% hydrophilic silicic acid | Screening 6 min. rolling at 8.5 rpm, after 1 min. addition of $SiO_2$ |
| 5 (control) | Rutile with 1.0% $Al_2O_3$ | — | NONE |
| 5a | do. | 2.0% hydrophilic silicic acid | Screening, $SiO_2$ addition, continuous rolling at 40 rpm. |
| 5b | do. | 0.25% hydrophilic silicic acid | Screening, $SiO_2$ addition, continuous rolling at 40 rpm. |
| 5c | do. | 2.0% hydrophilic silicic acid | Screening, $SiO_2$ addition, continuous rolling at 40 rpm. |
| 5d | do. | | Screening, continuous rolling at 40 rpm. |
| 5e | do. | 2.0% hydrophilic silicic acid | $SiO_2$ addition, continuous rolling at 40 rpm. |

| | SCREEN MESH WIDTH mm | FREE-FLOWING ABILITY-mm DISCHARGE TUBE DIAMETER | STACKING STRENGTH IN TERMS OF FREE FLOWABILITY TUBE DIAMETER (following loading) | DISPERSIBILITY IN PLASTICS | DISPERSIBILITY IN VARNISHES |
|---|---|---|---|---|---|
| 4 | — | none | none | 1.0 | — |
| 4a | 1.0 | 5 | 5 | 1.0 | — |
| 4b | 1.0 | 8 | 8 | 1.0 | — |
| 5 | — | none | none | 3.0 | — |
| 5a | 0.75 | 2.5 | 2.5 | 2.7 | — |
| 5b | 0.75 | 2.5 | 5 | 3.0 | — |
| 5c | 2.0 | 5 | 5 | 3.0 | — |
| 5d | 0.75 | 5 | none | 3.0 | — |
| 5e | — | 12 | 15 | 3.3 | — |

EXAMPLE 6

200 g of the same rutile pigment as used in Example 2 were used. The pigment was screened through a screen of 1 mm mesh width and rolled in a 1 liter flask for a total of 30 minutes at 40 rpm. After the initial 5 minutes 2.0% highly dispersed hydrophilic aluminum oxide was added. The granulated pigment obtained had good free flowability when tested in a 5 mm discharge tube and its flowability was also designated as good after pressure loading [using an 8 mm discharge tube width].

EXAMPLE 7

The experiment of Example 6 was repeated with the difference that after the initial 5 minutes rolling time 2.0% highly dispersed titanium dioxide pigment coated with 10% silicon dioxide and 5% aluminum oxide and hydrophobized with 2.0% silicon oil was added. The titanium dioxide had rutile structure and a specific BET surface of 45 sq. m/g. In this case, also, the granulated pigment had good free flowability when tested in a 5 mm discharge tube both before and after pressure loading [using a 12 mm discharge tube width].

The invention may be carried out in other specific ways than those herein set forth without departing from the spirit and essential characteristics of the invention and the present embodiments are, therefore, to be considered in all respects as illustrative and not restrictive, and all changes coming within the meaning and equivalency range of the appended claims are intended to embraced therein.

We claim:

1. Process for the manufacture of compacting resistant free-flowing titanium dioxide pigments of good dispersibility by screening and subsequent rolling characterized in that dry milled titanium dioxide pigment is screened prior to the addition of highly dispersed oxides selected from the group consisting of silicic acid, titanium dioxide and aluminum oxide and then subjected to rolling in the presence of said oxides, said oxides being added in amounts of 0.1 to 5.0%, and having a mean particle size of about 10-20 mm.

2. Process according to claim 1 wherein the amount of oxides added is in the range from 0.25 to 2.0%.

3. Process according to claim 1 characterized in that the highly dispersed oxides are added after the screening and immediately prior to rolling.

4. Process according to claim 1 characterized in that the highly dispersed oxides are added during rolling.

5. Process according to claim 1 characterized in that the dry pigment is screened through a screen having mesh width of 0.3 to 5.0 mm.

6. Process according to claim 5 wherein the mesh width is 0.75 to 2.00 mm.

7. Process according to claim 1 characterized in that rolling is carried out discontinuously.

8. Process according to claim 1 characterized in that rolling is carried out continuously.

9. Process according to claim 1 characterized in that the mixture of screened pigment and highly dispersed oxide is subjected to rolling for 1 to 120 minutes.

10. Process according to claim 9 wherein the pigment is subjected to rolling from 2 to 60 minutes.

11. A titanium dioxide pigment manufactured according to claim 1 which is resistant to compacting and is free-flowing with good dispersibility.

* * * * *

UNITED STATES PATENT OFFICE
CERTIFICATE OF CORRECTION

Patent No. 3,873,335   Dated March 25, 1975

Inventor(s) Gunter Schmidt, Carlo Servais

It is certified that error appears in the above-identified patent and that said Letters Patent are hereby corrected as shown below:

Claim 1 line 4 after "dry" insert a comma (,)

Claim 1 last line change "mm" to - nm -

Signed and sealed this 15th day of July 1975.

(SEAL)
Attest:

RUTH C. MASON
Attesting Officer

C. MARSHALL DANN
Commissioner of Patents
and Trademarks